(12) United States Patent
Adamy et al.

(10) Patent No.: US 6,434,436 B1
(45) Date of Patent: Aug. 13, 2002

(54) PROCESS AND SYSTEM FOR SETTING CONTROLLER PARAMETERS OF A STATE CONTROLLER

(75) Inventors: Juergen Adamy, Rossdorf; Martin Koenemund, Nuremberg, both of (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/557,874

(22) Filed: Apr. 24, 2000

Related U.S. Application Data

(63) Continuation of application No. PCT/DE98/03006, filed on Oct. 12, 1998.

(30) Foreign Application Priority Data

Oct. 24, 1997 (DE) .......................................... 197 47 125

(51) Int. Cl.$^7$ .............................. G05B 5/01; G05B 13/02
(52) U.S. Cl. .............................. 700/37; 700/32; 700/52; 700/34
(58) Field of Search .............................. 700/28, 32, 37, 700/52, 33, 34, 54

(56) References Cited

U.S. PATENT DOCUMENTS

| | | | | |
|---|---|---|---|---|
| 4,214,300 A | * | 7/1980 | Barlow et al. | 364/105 |
| 5,406,474 A | * | 4/1995 | Hansen | 364/148 |
| 5,587,896 A | * | 12/1996 | Hansen et al. | 364/148 |
| 5,638,267 A | * | 6/1997 | Singhose et al. | 364/148 |
| 6,014,613 A | * | 1/2000 | Dati et al. | 702/190 |

FOREIGN PATENT DOCUMENTS

DE  42 38 833 A1  7/1993

OTHER PUBLICATIONS

Preuss, H.P., "Charakteristische Polkonfigurationen betragsoptimaler Regelkreise—Characteristical losed–loop pole locations owing to the method of gain optimum," *Automatisierungstechnik*, V40, N10, Oct. 1, 1992, pgs. 373–378.

Shi, G., et al., "Circular Pole Assignment For Continuous–Time Descriptor Systems," *Control Theory and Advanced Technology*, V10, N2, Jun. 1994, pp. 187–194.

Bunzemeier, V.A., "Ein praxisorientiertes Inbetriebnahme–konzept fuer Zustandsregler im Bereich der Dampftemperaturregelung," *VGB Kraftwerkstechnik*, V76, N11, 1996, pp. 911–917.

Foellinger, Otto "Regelungstechnik", *Huethig Buch Verlag Heidelberg*, 6$^{th}$ ed. 1990, 196–199, 226–234, 460–463.

* cited by examiner

*Primary Examiner*—Paul P. Gordon
(74) *Attorney, Agent, or Firm*—Sughrue Mion, PLLC

(57) ABSTRACT

Process for setting controller parameters (PA, K1 ... Kn) of a state controller (SC) which, together with a plant (PL), forms a closed control circuit (C). The controller parameters (PA, K1 ... Kn) are variable only in such manner that, in a representation of the poles (P1 ... P5) of the closed control circuit (C) in a complex frequency range plane (FP, IM, RE), the setting of the controller parameters causes a shift of the poles (P1 ... P5) approximately along semi-circular arcs (K) and/or origin rays (A1 ... A3). It is advantageous that according to the process of the invention the setting of the controller parameters (PA, K1 ... Kn) of the state controller (SC) can be performed by setting predetermined setting parameters that are, from a control-technological standpoint, easily understandable and recognizable. Such parameters are, for example, amplitude factor ($\kappa$), rise time ($\mu$), or transient recovery time (t).

28 Claims, 2 Drawing Sheets

PROCESS AND SYSTEM FOR SETTING CONTROLLER PARAMETERS OF A STATE CONTROLLER

This is a Continuation of International Application PCT/DE98/03006, with an international filing date of Oct. 12, 1998, the disclosure of which is incorporated into this application by reference.

FIELD OF AND BACKGROUND OF THE INVENTION

The invention relates to a process as well as a system for setting controller parameters of a state controller.

State controllers have the advantage that with suitable parameterization a high control quality is achievable. In particular, with respect to the widely distributed PID controllers, a significantly better control behavior is achievable.

From A. Bunzmeier's "Ein praxisorientiertes Inbetriebnahmekonzept für Zustandsregler im Bereich der Dampftemperaturregelung" [A Practice-oriented Start-up Concept for State Controllers in the Field of Steam Temperature Control], VGB Kraftwerktechnik [VGB Power Plant Technology] 76, 1996, Volume 11, Pages 911 to 917, a state control with a start-up concept for the control of a steam superheater is known.

A difficulty of state controlling lies in the fact that, in general, significant skill in the art is required to parameterize a state controller so that a desired control behavior is achieved. The poles underlying a closed control circuit having a plant and a state controller, in a representation of the poles in a complex frequency range plane, are determinative for the control behavior of the control circuit. These poles are determinable by the parameterization of the state controller. Thereby it is difficult to judge the prospective control behavior from the controller parameters or the poles. In particular, extensive relevant skill in the art is required.

OBJECTS OF THE INVENTION

It is one object of the invention to improve the setting of controller parameters of a state controller, to achieve the desired control behavior of the closed control circuit.

SUMMARY OF THE INVENTION

According to one formulation, the invention is directed to a process for setting controller parameters of a state controller wherein, in a first step, a monitor and a basis state controller are arranged to form the state controller. Next, the state controller and a plant are arranged to form a closed control circuit, wherein the closed control circuit has at least one pole and one zero that are represented in a complex frequency range plane. Measuring indices are output from the plant to the monitor. The monitor generates, from these measuring indices, estimated control values which are supplied to the basis state controller. The controller parameters of the state controller are set with a controller setting apparatus to optimize a control behavior of the closed control circuit such that the at least one pole is shifted approximately along semi-circular arcs and/or rays originating from the origin in the complex frequency range plane.

According to another formulation, the invention is directed to a system associated with the process just described. The system includes a plant to output the measuring indices, a monitor to receive the measuring indices and to output estimated control values, a basis state controller to receive the estimated control values from the monitor, and a controller setting apparatus to set the controller parameters of the state controller to optimize and fine tune the control behavior of the closed control circuit.

It is one advantage of the process according to the invention that the controller parameters of the state controller are modifiable only in such a way that, in a representation of the poles of the closed control circuit in a complex frequency range plane, the setting causes a shift of the poles approximately along semi-circular arcs and/or along rays from the origin.

Another particular advantage is that the invention adjusts the control parameters of the state controller by providing, in advance, control parameters that are easily understood and recognized from a control-technological standpoint. Proceeding from a base setting of the state controller, a fine-tuning of the closed control circuit, which is based on the base setting, can be accomplished without particular control-technological expertise. The base setting is, for example, a coarse preliminary setting of the state controller.

Thereby, in the case of a plant to be controlled by a state controller, it is advantageously possible to proceed, as a starting basis, from a state controller with a standardized base setting of the control parameters. The standardized base setting or the state controller itself is, for example, selectable from a catalog contained in a memory. By the process according to the invention, a setting, and in particular an optimization, of the control parameters of the state controller can then be performed in a simple way. Thus, the desired control behavior of the closed control circuit is achieved.

It is another advantage of the process of the invention which is based on, from a control-technological standpoint, easily understandable and recognizable setting parameters, that a shift of the poles and thereby an adjustment of the control behavior of the closed control circuit is accomplished. In particular, such setting parameters include amplitude factor, rise time or transient recovery time.

BRIEF DESCRIPTION OF THE DRAWINGS

The invention is explained further with the aid of the exemplary embodiments represented in the following figures, where.

DETAILED DESCRIPTION OF THE PREFERRED EMBODIMENTS

Figure 1:
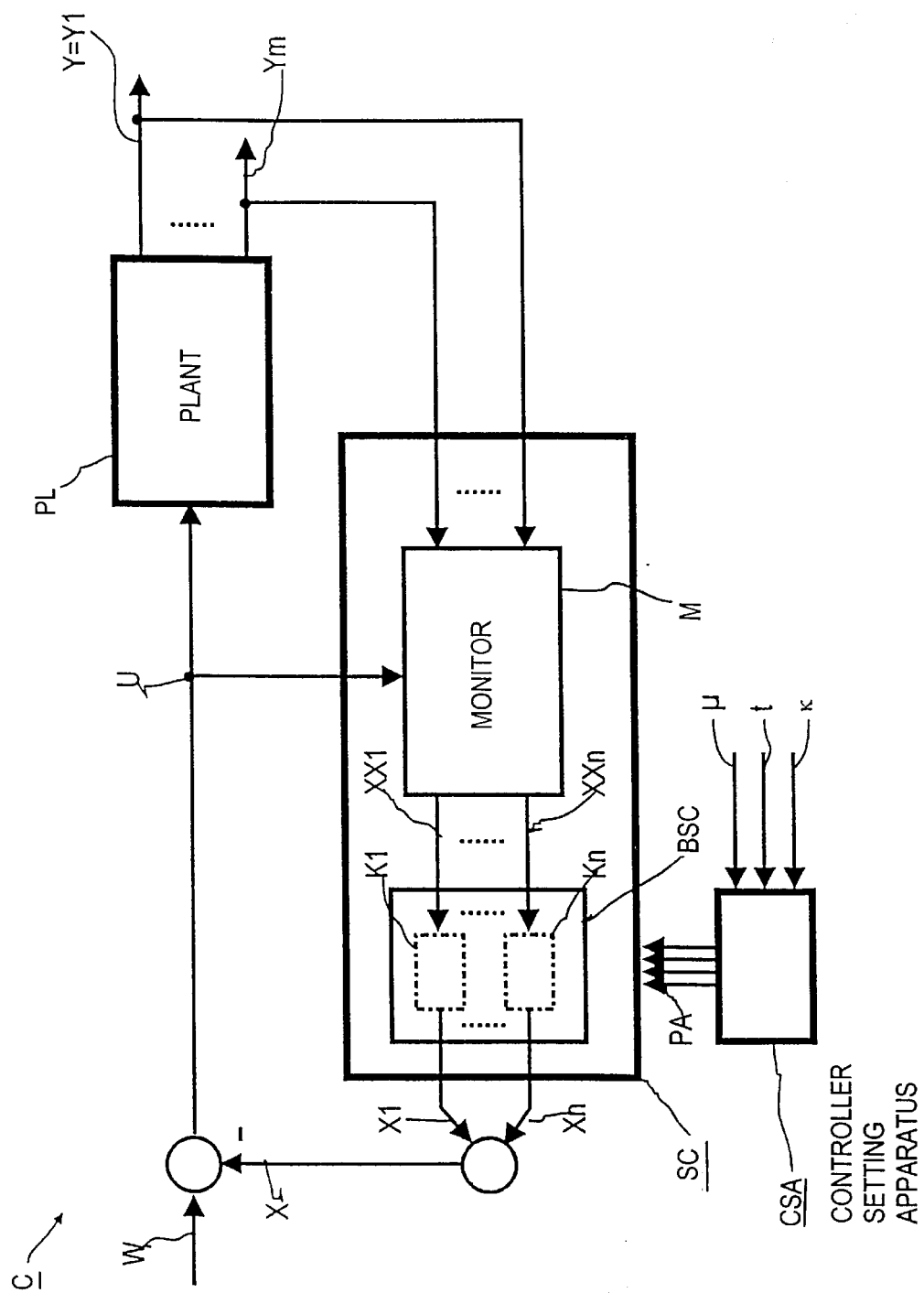
FIG. 1 shows, as an example, a closed control circuit with plant and state controller with monitor.

In the specific embodiment of FIG. 1, a closed control circuit C is represented which is formed of at least a state controller SC and a plant PL. The state controller SC has in particular a monitor M for the output of estimated control values XX1 to XXn. These control values XX1 to XXn are generated from measuring indices Y1 to Ym of the plant PL and from a positioning index U fed to the plant PL. As a rule, one of the measuring indices Y1 to Ym of the plant PL is a control index Y. This control index Y is that index whose actual value is controlled by the state controller SC wherein a desired control value W is predetermined. In the example of FIG. 1, the measuring index Y1 has been selected as the control index Y. The estimated control values XX1 to XXn correspond roughly, as is customary for state monitors M, to state indices of the plant PL. These state indices are, in general, not directly measurable. Furthermore, the state controller SC has a basis state controller BSC to which the estimated control values XX1 to XXn of the state monitor M are fed. From the estimated control values XX1 to XXn, the basis state controller BSC generates controller output indices X1 to Xn whose sum yields an actual controller value X. The subtraction of the actual controller value X from the desired control value W yields the positioning index U fed to the plant.

The basis state controller BSC of the state controller SC has controller coefficients K1 and Kn which determine, as components of control parameters PA of the state controller SC, the control behavior of the closed control circuit C. The values of the controller coefficients K1 to Kn influence poles of the closed control circuit C so that, in a representation of the poles in a complex frequency range plane, the position of the poles of the closed control circuit C is varied by means of the controller coefficients K1 to Kn. The basis state controller BSC is also designated as "state controller" where the state controller SC is then designated as "state controller with monitor." However, for reasons of comprehensibility, the designations originally introduced will be used.

To carry out a preferred embodiment of the process according to the invention, a controller setting apparatus CSA is assigned to the state controller SC. The state controller SC is provided for setting the controller parameters PA and, connected therewith, setting the controller coefficients K1 to Kn. In the following, the setting of the controller parameters PA is also understood to be the setting of the controller coefficients K1 to Kn. In particular, parameters such as an amplitude factor K, a transient recovery time factor $\mu$, and/or a rise time t are fed to the controller setting apparatus CSA as setting parameters for the control behavior of the closed control circuit C. These parameters are easily understood and recognized from a control-technological standpoint. Therein, the amplitude factor K is a measure for the intensity of the oscillations in the closed control circuit C. The rise time t and the transient recovery time factor $\mu$ are a measure for the time period and the speed, respectively, of the closed control circuit C to sufficiently approximate a stationary value when a jump in guidance or interference indices occurs.

Figure 2A:
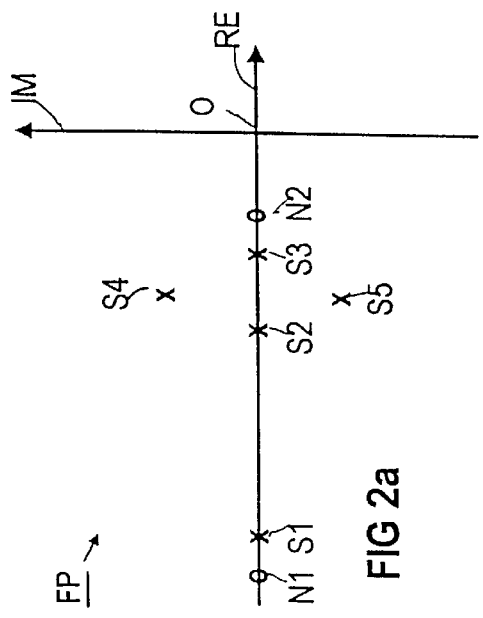
FIG. 2a shows, as an example, a representation of the poles of the plant in a complex frequency range plane.

In FIG. 2a, marked with an "x" and "o," exemplary poles S1 to S5 and zeros N1 to N2 of the plant PL, respectively, are represented in a complex frequency range plane FP. The represented poles and zeros of the plant PL depend in particular on the characteristics of the plant PL actually used. The plant may be a machine to be controlled, for example a plastic injection-molding machine.

The representation of the poles and the zeros S1 to S5 and N1 to N2 of the plant PL, respectively, are preferably obtained by a so-called "Laplace transformation" of the transmission function of the plant from the time range into the complex frequency range. The complex frequency range is represented in this and the following figures as the complex frequency range plane FP. The frequency range plane FP is also designated as the so-called "s-plane." The complex frequency range plane FP has an imaginary component axis IM and a real component axis RE. The origin of the frequency range plane FP at which the imaginary as well as the real component axes IM and RE have the value zero is designated with O.

Figure 2B:
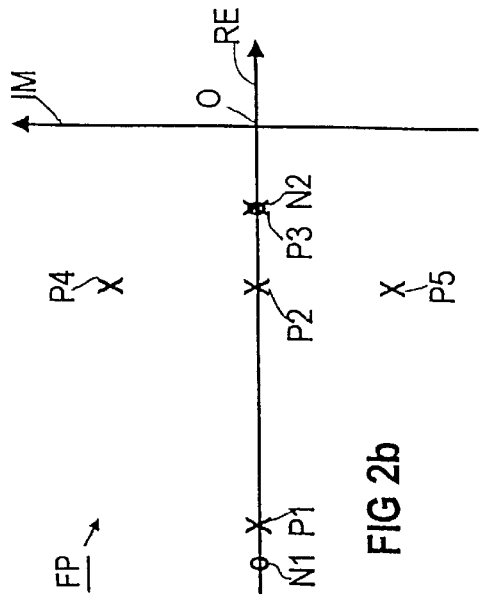
FIG. 2b shows, as an example, a representation of the closed control circuit in a complex frequency range plane with a base setting of the controller parameters of the state controller.

In the example FIG. 2b, the closed control circuit C is represented in the complex frequency range plane FP. In this case, the closed control circuit C is formed of the plant represented in FIGS. 1 and 2a with the poles and zeros S1 to S5 and N1 to N2 as well as the state controller SC. The representation in the complex frequency range plane FP is comparable to that of FIG. 2a but the transform into the complex frequency range is based on the transmission function of the entire closed control circuit C. The poles of the state controller SC itself are, for reasons of comprehensibility, not specified. Thus, in the representation in the complex frequency range plane FP, the closed circuit C has the zeros N1 to N2 as well as the poles P1 to P5, the latter of which are marked with "x."

In the representation of FIG. 2b, the closed control circuit C is based on the abovecited base setting of the state controller SC. With the process according to the invention, the controller parameters PA of the state controller SC are now settable. By setting the controller parameters PA according to the invention, the control behavior of the closed control circuit C is optimizable.

Figure 2C:
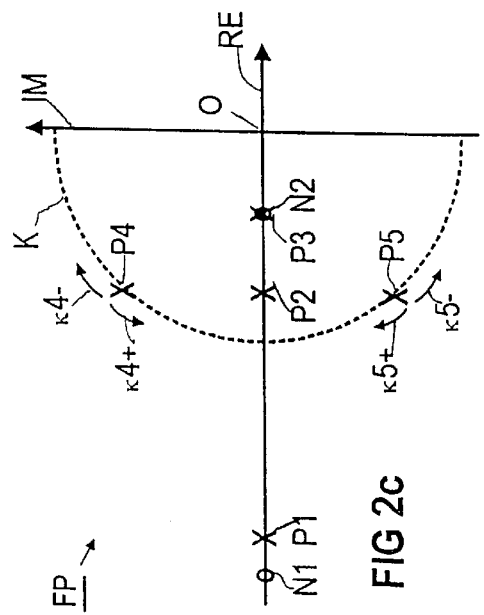
FIG. 2c shows, as an example, the representation of the closed control circuit in a complex frequency range plane of FIG. 2b wherein the setting according to the invention causes a shift of the poles approximately along semicircular arcs.
Figure 2D:
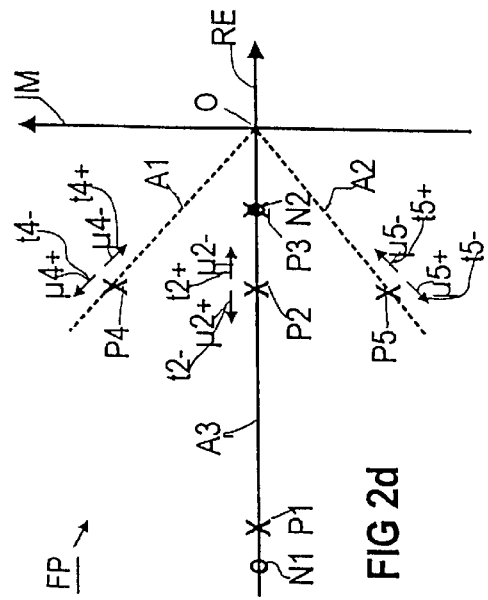
FIG. 2d shows, as an example, the representation of the closed control circuit in a complex frequency range plane of FIG. 2b, wherein the setting according to the invention causes a shift of the poles approximately along rays from the origin.

FIGS. 2c and 2d represent how the process according to the invention for setting the controller parameters PA of the state controller SC acts on the poles P1 to P5 of the closed control circuit C. Thereby, according to the invention, the controller parameters PA including the controller coefficients K1 to Kn can be changed only in such a way that, in the representation of the poles P1 to P5 of the closed control circuit C in the complex frequency range plane FP, the setting causes a shift of the poles P1 to P5. This shift is approximately or exactly along semi-circular arcs K and/or rays A1 to A3 from the origin. The following is an exemplary description of the invention utilizing the semi-circular arc K for the poles P4 and P5 as well as the rays A1 to A3 for the poles P2, P4 and P5.

In FIG. 2c, an exemplary setting according to the process according to the invention is represented. This setting causes a shift of the poles P4 and/or P5 approximately along the semi-circular arc K. Preferably, the semi-circular arc K is located in the negative complex half-plane of the frequency range plane FP and has the origin O of the frequency range plane FP as its center. The negative complex half-plane is the half-plane on the left of the imaginary component axis IM, that is, the half-plane which contains the negative real component axis.

In one embodiment of the invention, the controller parameters PA are variable only in such a manner that a shift of those poles P4 and P5 along the semi-circular arc K is caused which do not lie on the real component axis RE of the frequency range plane FP. Thus, the controller parameters PA are variable only in such a manner that poles lying on the real component axis RE, such as the poles P1, P2 and P3 are not variable along a semi-circular arc.

In a further embodiment of the invention, also represented in FIG. 2c, the controller parameters PA are variable only in such a manner that a shift of at least one of the poles P4 and/or P5 along a semi-circular arc K is caused so as to increase or decrease the amplitude factor $\kappa$. This shift is in the direction of the real and imaginary component axis RE and IM, respectively. In a setting according to the invention that leads to a shift of at least one of the poles P4 and/or P5 along the semi-circular arc K in the direction of the imaginary component axis IM, the amplitude factor K of the closed control circuit R is decreased. The direction of the shift is designated with the reference numbers κ4− and κ5−. In a setting according to the invention that leads to a shift of at least one of the poles P4 and/or P5 along the semi-circular arc K in the direction of the real component axis RE, the amplitude factor κ of the closed control circuit R is increased. The direction of the shift is designated with the reference numbers κ4+ and κ5+.

Preferably, in the case of pairs of poles such as the pair of poles P4 and P5, the controller parameters PA are variable only in such manner that an axially symmetric shift of the pair of poles is caused. In the example of FIG. 2c, the poles P4 and P5 are axially symmetrically shifted toward one another with respect to the real component axis RE, that is, toward the real component axis RE. This shift occurs along the semi-circular arc K. They can also be shifted axially symmetrically apart from one another with respect to the real component axis RE, that is, toward the imaginary component axis IM.

In accordance with another embodiment of the invention, FIG. 2d depicts a setting that causes a shift of the poles P2, P4 and/or P5 approximately along rays A1 to A3. The rays A1 to A3 have the origin 0 as their starting point and run preferably in the negative complex half-plane of the frequency range plane FP.

In a further embodiment of the invention, also represented in FIG. 2d, the controller parameters PA are variable only in such manner that a shift of at least one of the poles P2, P4 and/or P5 along a ray A1 to A3 away from the origin or towards the origin 0 of the frequency range plane FP causes an increase or decrease in the transient recovery time factor $\mu$ of the closed control circuit C. Inversely analogous to the transient recovery time factor $\mu$, the rise time t of the closed control circuit C is also settable. To increase or decrease the rise time t, the controller parameters PA are variable only in such manner that a shift of at least one of the poles P2, P4 and/or P5 along a ray A1 to A3 away from the origin or towards the origin O of the frequency range plane FP results.

In the setting according to the invention that leads to a shift of at least one of the poles P2, P4 and/or P5 along the corresponding ray A1 to A3 towards the origin O, the transient recovery time factor $\mu$ is thus decreased and the rise time t is increased. The direction of the shift is designated with $\mu2-$, $\mu4-$ and $\mu5-$ or t2+, t4+, and t5+. In contradistinction thereto, in the setting according to the invention that leads to a shift of at least one of the poles P2, P4, and/or P5 along the corresponding ray A1 to A3 away from the origin O, the transient recovery time factor $\mu$ is thus increased and the rise time t is decreased. The direction of the shift is designated with $\mu2+$, $\mu4+$, and $\mu5+$ or t2−, t4−, and t5−.

Preferably, in the case of pairs of poles such as the pair of poles P4 and P5, the controller parameters PA are variable only in such manner that an axially symmetric shift with respect to the real component axis RE is caused. The poles P4 and P5 are then, in the example of FIG. 2d, shifted along the corresponding rays A1 and A2, respectively, either axially symmetrically toward the origin O or away from it.

Preferably, the controller parameters PA are furthermore variable only in such a manner that no shift of poles that compensate zeros is caused, for example the pole P3 of the closed control circuit C. This pole compensates the zero N2.

Furthermore, according to another embodiment of the invention, the controller parameters PA are variable only in such a manner that, for poles with a great influence on the amplification of the closed control circuit C, again, no shift is permitted. An example for such a pole is the pole P1.

The above description of the preferred embodiments has been given by way of example. From the disclosure given, those skilled in the art will not only understand the present invention and its attendant advantages, but will also find apparent various changes and modifications to the structures and processes disclosed. It is sought, therefore, to cover all such changes and modifications as fall as within the spirit and scope of the invention, as defined by the appended claims, and equivalents thereof.

What is claimed is:

1. A process for setting controller parameters of a state controller, comprising:
   (a) arranging a monitor and a basis state controller to form the state controller;
   (b) arranging the state controller and a plant to form a closed control circuit, the closed control circuit having at least one pole and at least one zero represented in a complex frequency range plane with an origin;
   (c) outputting measuring indices from the plant to the monitor;
   (d) in the monitor, generating estimated control values from the measuring indices;
   (e) supplying the estimated control values from the monitor to the basis state controller; and
   (f) with a controller setting apparatus, setting the controller parameters of the state controller to optimize a control behavior of the closed control circuit such that the at least one pole is shifted at least approximately along at least one geometric line in the complex frequency range plane selected from the group consisting of at least one semi-circular arc and at least one ray originating from the origin.

2. The process of claim 1, wherein, in the setting step (f), only the at least one pole that does not compensate the at least one zero of the closed control circuit is shifted.

3. The process of claim 1, further comprising setting a base setting of the state controller and thereafter fine tuning the state controller.

4. The process of claim 3, wherein, in the step of setting a base setting of the state controller, one of a plurality of standardized base settings of the state controller is selected from a catalog containing the plurality of standardized base settings.

5. The process of claim 3, wherein, in the step of setting a base setting of the state controller, one of a plurality of standardized state controllers is selected from a catalog containing the plurality of standardized state controllers.

6. The process of claim 3, wherein, in the step of setting a base setting of the state controller, one of a plurality of standardized base settings of the state controller and one of a plurality of standardized state controllers are selected from a catalog containing the plurality of standardized base settings of the control parameters and the plurality of standardized state controllers.

7. The process of claim 1, wherein, in the setting step (f), the at least one pole of the closed control circuit is shifted along the semi-circular arc, which is located in a negative half-plane of the complex frequency range plane and which has the origin of the complex frequency range plane as a radial center.

8. The process of claim 1, wherein, in the setting step (f), the at least one pole of the closed control circuit is shifted along rays originating from the origin, which are located in a negative half-plane of the complex frequency range plane.

9. The process of claim 1, wherein, in the setting step (f), the controller parameters of the state controller are set such that only poles of the closed control circuit that are not located on a real component axis of the complex frequency range plane are shifted along the semi-circular arc in the complex frequency range plane.

10. The process of claim 1, wherein, in the setting step (f), in order to increase or to decrease an amplitude factor of the closed control circuit, the controller parameters of the state controller are adjusted only in such a manner that the at least one pole of the closed control circuit is shifted along the at least one semi-circular arc either towards a real component axis or toward an imaginary component axis, respectively.

11. The process of claim 1, wherein, in the setting step (f), in order to increase or decrease a transient recovery time factor of the closed control circuit, the controller parameters of the state controller are adjusted only in such a manner that the at least one pole of the closed control circuit is shifted along the at least one ray originating from the origin either towards the origin or away from the origin, respectively.

12. The process of claim 1, wherein, in the setting step (f), in order to increase or decrease a rise time of the closed control circuit, the controller parameters of the state controller are adjusted only in such a manner that the at least one pole of the closed control circuit is shifted along the at least one ray originating from the origin either towards the origin or away from the origin, respectively.

13. The process of claim 1, wherein, in the setting step (f), the controller parameters of the state controller are adjusted only in such a manner that pairs of poles of the closed control circuit are shifted in an axially symmetrical manner.

14. A process for setting controller parameters of a state controller having a monitor and a basis state controller and forming, together with a plant, a closed control circuit with at least one pole, comprising:
   (a) outputting measuring indices from the plant to the monitor;
   (b) in the monitor, generating estimated control values from the measuring indices;
   (c) supplying the estimated control values from the monitor to the basis state controller; and
   (d) with a controller setting apparatus, setting the controller parameters of the state controller to optimize a control behavior of the closed control circuit such that the at least one pole, in a representation of the at least one pole in a complex frequency range plane with an origin, is shifted at least approximately along at least one geometric line in the complex frequency range plane, the geometric line being selected from the group consisting of at least one semi-circular arc and at least one ray originating from the origin.

15. A system for setting controller parameters of a closed control circuit having at least one pole and at least one zero, comprising:
   a plant that outputs measuring indices;
   a monitor that receives the measuring indices from the plant and outputs estimated control values generated from the measuring indices;
   a basis state controller that receives the estimated control values from the monitor; and
   a controller setting apparatus that sets the controller parameters for optimization and fine tuning of a control behavior of the closed control circuit such that the at least one pole, in a representation of the at least one pole in a complex frequency range plane with an origin, is shifted at least roughly along at least one geometric line in the complex frequency range plane, the geometric line being selected from the group consisting of at least one semi-circular arc and at least one ray originating from the origin.

16. The system of claim 15, wherein the controller setting apparatus is structured to shift only the at least one pole that does not compensate the at least one zero of the closed control circuit.

17. The system of claim 15, further comprising a catalog containing at least one of a plurality of standardized base settings of the state controller and a plurality of standardized state controllers.

18. The system of claim 15, wherein the controller setting apparatus is structured to shift the at least one pole of the closed control circuit substantially along the semi-circular arc, which is located in a negative half-plane of the complex frequency range plane and which has the origin of the complex frequency range plane as a radial center.

19. The system of claim 15, wherein the controller setting apparatus is structured to shift the at least one pole of the closed control circuit substantially along rays originating from the origin, which are located in a negative half-plane of the complex frequency range plane.

20. The system of claim 15, wherein the controller setting apparatus is structured to set the controller parameters of the state controller such that only poles of the closed control circuit that are not located on a real component axis of the complex frequency range plane are shifted along the semi-circular arc in the complex frequency range plane.

21. The system of claim 15, wherein the controller setting apparatus is structured such that, in order to increase or to decrease an amplitude factor of the closed control circuit, the controller parameters of the state controller are adjusted only in such a manner that the at least one pole of the closed control circuit is shifted along the at least one semi-circular arc either towards a real component axis or toward an imaginary component axis, respectively.

22. The system of claim 15, wherein the controller setting apparatus is structured such that, in order to increase or decrease a transient recovery time factor of the closed control circuit, the controller parameters of the state controller are adjusted only in such a manner that the at least one pole of the closed control circuit is shifted along the at least one ray originating from the origin either towards the origin or away from the origin, respectively.

23. The system of claim 15, wherein the controller setting apparatus is structured such that, in order to increase or decrease a rise time of the closed control circuit, the controller parameters of the state controller are adjusted only in such a manner that the at least one pole of the closed control circuit is shifted along the at least one ray originating from the origin either towards the origin or away from the origin, respectively.

24. The system of claim 15, wherein the controller setting apparatus is structured such that the controller parameters of the state controller are adjusted only in such a manner that pairs of poles of the closed control circuit are shifted in an axially symmetrical manner.

25. A system, comprising:
   a closed control circuit comprising:
      a unit configured to be controlled by an input value and to output a plurality of measuring indices;
      a state controller configured to receive the measuring indices, to receive a plurality of control parameters, and to output control output indices; and an element configured to receive the control output indices and output the input value; and a controller setting apparatus configured to receive at least one setting parameter as an input and to adjust a control behavior of the closed control circuit in accordance with at least one controller parameter output by the controller setting apparatus;

wherein:

the closed control circuit has at least one pole location in a complex frequency range plane representation of the closed control circuit;

the complex frequency range plane includes an origin, a real-component axis and an imaginary-component axis; and a value of the controller parameter output by the controller setting apparatus corresponds to a shift of the at least one pole location at least generally along a geometric line that is either a semicircular arc having a focus at the origin or a ray originating from the origin.

26. The system of claim 25, wherein the setting parameter comprises at least one of an amplitude factor, a transient recovery time factor and a rise time.

27. The system of claim 25, wherein the input value output by the element comprises a difference between a desired control value and an actual control value, the actual control value being a sum of the control output indices output by the state controller.

28. The system of claim 25, wherein the state controller comprises:

a monitor receiving the measuring indices and outputting estimated control values generated from the measuring indices; and a basis state controller receiving the estimated control values from the monitor and outputting the control output indices to the element.

* * * * *